Nov. 3, 1970     D. I. SINIZER ET AL     3,537,170

STRESS-ORIENTED FILAMENT WINDING IN COMPOSITE PANELS

Filed June 16, 1967     2 Sheets-Sheet 1

INVENTORS
DAVID I. SINIZER, ALBERT TOY
DAVID G. ATTERIDGE
LOUIS H. FANELLI
BY

ATTORNEY

Nov. 3, 1970  D. I. SINIZER ET AL  3,537,170
STRESS-ORIENTED FILAMENT WINDING IN COMPOSITE PANELS
Filed June 16, 1967  2 Sheets-Sheet 2
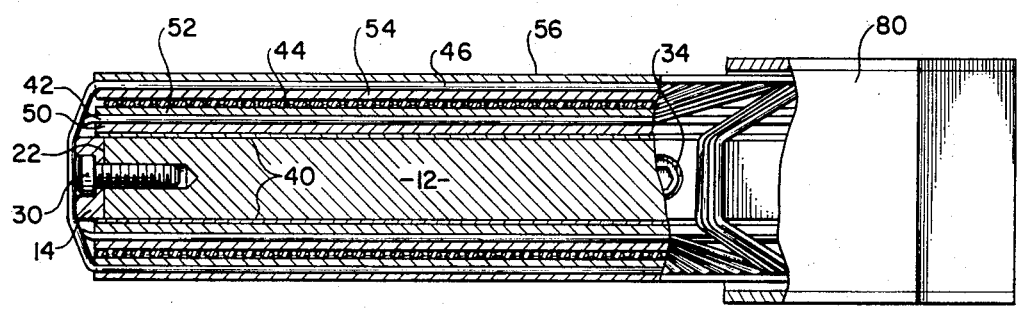
FIG. 2
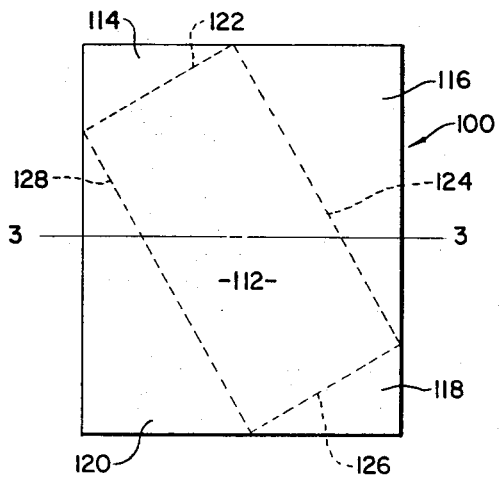
FIG. 5
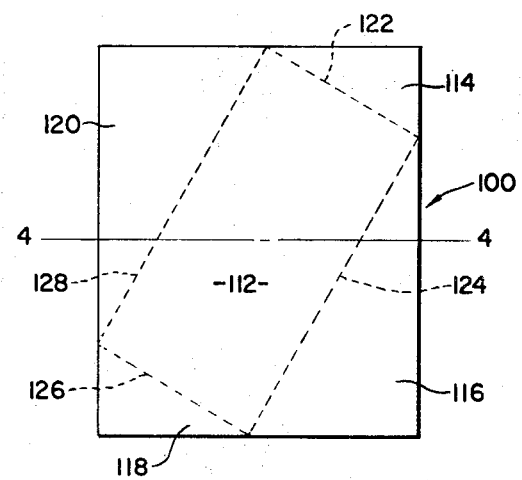
FIG. 6
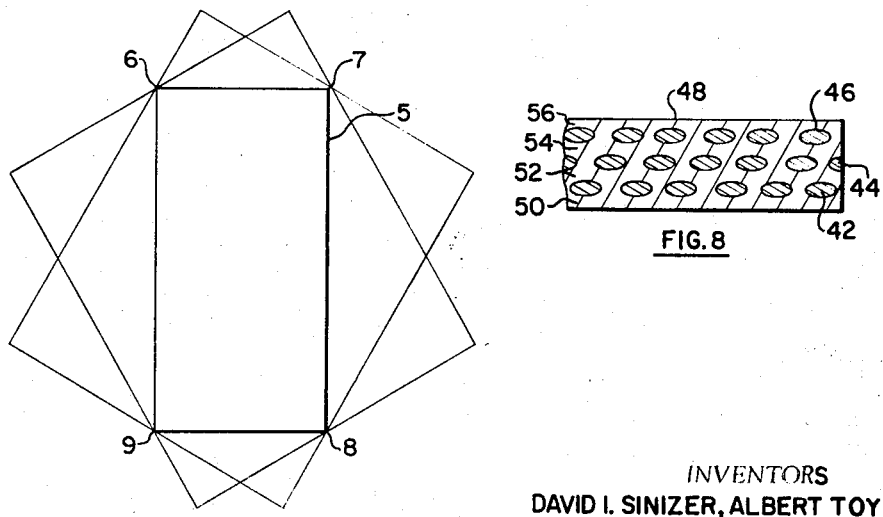
FIG. 7
FIG. 8
INVENTORS
DAVID I. SINIZER, ALBERT TOY
BY DAVID G. ATTERIDGE
LOUIS H. FANELLI
ATTORNEY United States Patent Office 3,537,170
Patented Nov. 3, 1970

3,537,170
STRESS-ORIENTED FILAMENT WINDING
IN COMPOSITE PANELS
David I. Sinizer, Playa del Rey, Albert Toy, Gardena, David G. Atteridge, Santa Monica, and Louis H. Fanelli, Los Angeles, Calif., assignors to North American Rockwell Corporation, a corporation of Delaware
Filed June 16, 1967, Ser. No. 646,582
Int. Cl. B23q 3/00
U.S. Cl. 29—467    6 Claims

ABSTRACT OF THE DISCLOSURE

Removable terraced peripheral edges on a rotating mandrel are adapted to receive successive windings of thin filament in a plurality of separate layers to form reinforced composite panels. The mandrel edges are reversed in position between each winding step to permit winding of filaments at stress-oriented cross-ply angles with a minimum of filament wastage, after which the workpiece components are diffusion bonded together. Rare earth oxides are used in stopoff coatings to prevent bonding of workpiece materials to mandrel surfaces.

BACKGROUND OF INVENTION

In the fabrication of composite filament reinforced materials, filament winding techniques are known to the prior art whereby the composite is initially formed by rotating a mandrel to form filament layers. The directional strength properties of the resulting composites are vastly improved by orienting filament direction so as to achieve a cross-ply angle between the layers. Composites of this type which are easiest to manufacture utilize a cross-ply angle of 90° between the dominant filament direction in two successive layers.

One of the problems sought to be solved by the concept in this case relates to the manufacture of filament reinforced composite panels wherein the filaments are situated at cross-ply angles other than 90°, and especially where cross-ply angles of any desired amount such as 22½° between dominant directions of filament orientation may be achieved with a minimum of filament or other workpiece material wastage. Extensive experience to date with filament reinforced structures indicates that maximum efficiency and economy in the use of filament materials, many of which are very expensive, costing as much as $5,000 per pound in the case of beryllium, conclusively demonstrates that the direction of each successive filament layer should be oriented according to the direction of external loads to be applied on the resulting final structure to achieve such efficiency.

In order to wind a multi-layer filament reinforced panel on a square or rectangular mandrel, such as segmented mandrel 100 shown in FIG. 5, the mandrel with its segmented parts assembled in the relationship shown by FIG. 5 may first be rotated about an axis of rotation 3—3 to form a first layer of parallel filaments which may contact each other and which will have a direction substantially normal to axis 3—3, after which the mandrel may be rotated about a second axis 4—4 shown in FIG. 6 while a second layer of filaments is progressively wrapped about the mandrel and the workpiece components assembled thereto. Between the foregoing winding steps, corner portions 114, 116, 118 and 120 may be removed from center portion 112 of segmented mandrel 100 and reassembled thereto in the relationship shown by FIG. 6. After bonding of the assembled workpiece components to form panels having the same size and shape as center portion 112 of segmented mandrel 100, it may be seen that the actual size of a rectangular workpiece having both plies of filament windings oriented in the desired directional relationship with respect to each other coincides with the area enclosed by the solid line designated by reference numeral 5 in FIG. 7 and having corners designated by numerals 6, 7, 8 and 9. As a result, the various triangular areas situated outside line 5 in FIG. 7 define portions of workpiece materials which will have to be removed and discarded, representing a useful yield in the final workpiece of about 50 percent or less of the total workpiece materials and involving a considerable expense in the manufacturing operation.

SUMMARY OF INVENTION

According to a preferred embodiment of this invention, a substantially flat plate having parallel top and bottom surfaces is provided for use as a mandrel in forming a plurality of composite plates or panels of filaments reinforced matrix. The novel method begins with placement of a sheet or film of stopoff material in close and continuous surface area contact on either side of the mandrel. Thereafter, a sheet of matrix material which may illustratively comprise aluminum also generally having the same shape as the mandrel is placed in close continuous contact with the stopoff layer. The mandrel is then rotated slowly about an axis while a single strand of filament is progressively wound entirely around the mandrel and the matrix sheets secured to either side thereof to form a layer of closely contacting and substantially parallel filaments. The wound filaments are securely held in place by tape or adhesive proximate the edges thereof when necessary. Such tape is removed before the bonding step is undertaken. After each filament layer is completed, another layer of matrix material is placed in contact with the filament layer and the mandrel and workpiece components assembled therewith are again rotated about an axis while another layer of filament is progressively wound from one end to the other of the entire mandrel and workpiece assembly. A final layer of matrix material is placed on either side of the assembled workpiece components and the entire assembly is subjected to heat and pressure in sufficient amounts and for a period of time necessary to cause substantially continuous bonding of the matrix and contacting filament elements together. Thereafter, the mandrel is separated from the workpiece components between which the mandrel is sandwiched, and two separate and identical workpiece composite sheets or panels are obtained. The fiber direction in each panel will be substantially perpendicular to the two different axes of rotation, whereby the angular orientation of the two stated axes with respect to the mandrel determines the directional orientation of each representative fiber layer. Moreover, when using the novel mandrel shown in FIGS. 1–4 herein, each of the panels may be trimmed as necessary with a minimum of resulting loss in workpiece materials to obtain perfectly rectangular panels as indicated by lines 22, 24, 26 and 28 in FIG. 3.

BRIEF DESCRIPTION OF DRAWINGS

FIG. 2 shows a fragmented view, partly in cross section, taken along line 2—2 in FIG. 1, FIGS. 3 and 4 show plan views of the mandrel shown in FIG. 1, with the edge portions reversed in position on the mandrel, FIGS. 5 and 6 show a rectangular mandrel with edge portions of different shape than that shown in FIGS. 1 through 4 and in alternate positions, FIG. 7 shows the final part size compared with wound filament area in connection with the apparatus of FIGS. 5 and 6, FIG. 8 shows a cross-sectional view through a workpiece fabricated with the apparatus of FIGS. 1–4 and taken along line 8—8 in FIG. 3, and FIG. 9 is an isolated fragmentary view of a detail modification of the mandrel shown in FIG. 1.

DETAILED DESCRIPTION OF INVENTION

Figure 1:
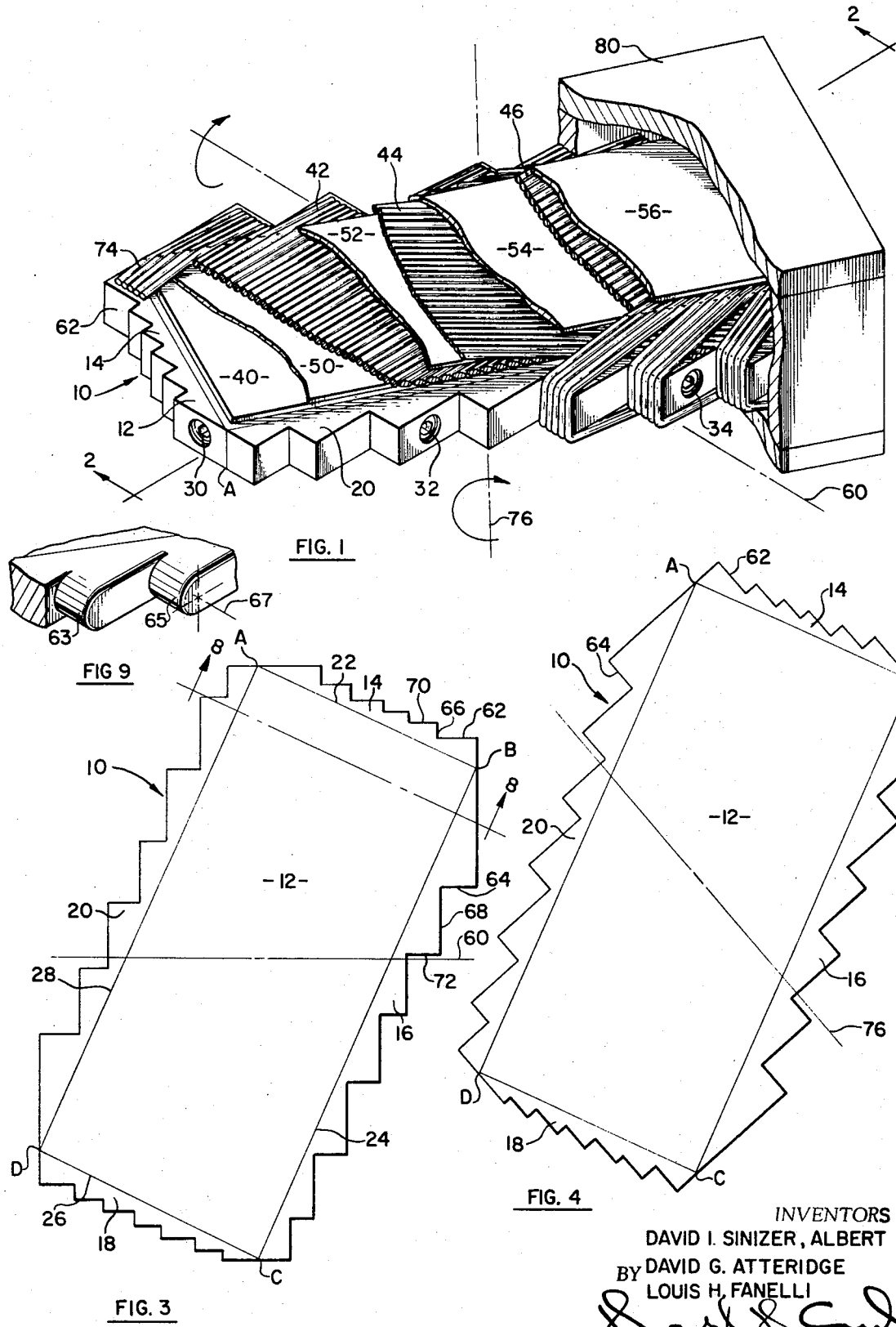
FIG. 1 shows a general perspective and fragmented view of a mandrel and workpiece assembly in a preparatory stage before bonding of the same according to the inventive method disclosed herein.

Referring to FIGS. 3 and 4 it may be seen that the invention initially contemplates a mandrel 10 having a plate-like center portion 12 with substantially parallel top and bottom surfaces, and a plurality of peripheral portions 14, 16, 18 and 20, removably secured to center portion 12 by suitable means such as a plurality of screws or bolts. Center portion 12 may illustratively be of quadrilateral shape as seen in FIGS. 3 and 4 comprising edges 22, 24, 26 and 28 enclosing corner angles A, B, C and D. Edge portions 14, 16, 18 and 20 of mandrel 10 are releasably held in continuous bearing contact with edges 22, 24, 26 and 28, respectively, by the forementioned bolts, three of which are designated by reference numerals 30, 32 and 34 in FIG. 1.

For reasons which will appear more clearly below, the workpiece sheets or slabs resulting from use of the apparatus disclosed herein generally correspond in area with center portion 12 shown, for example, in FIG. 3. The finished workpiece will generally conform with that illustratively shown in FIG. 8, which shows a cross-sectional view through a panel having separate layers 42, 44 and 46 of filaments embedded in a mass 48. Two identical panels are formed by each winding step on mandrel 10, one above and one below the mandrel, as shown by FIG. 2, for example.

The novel process may begin with placement of a separating or stopoff layer of material overlying center portion 12 of the mandrel and functioning to prevent permanent joinder of workpiece materials to the mandrel. The mentioned layer is shown in FIG. 1 and designated by numeral 40, which may comprise a thin sheet. Alternatively, the surface of mandrel 10, especially center portion 12 thereof, may be coated with a material adapted to prevent bonding of the workpiece components therewith during the bonding cycle. The coating is applied directly to the clean surface of the mandrel such as by brushing the material onto the surface or by dipping the mandrel into a slurry of the coating material followed by a curing step where necessary or desirable. The stated coating material preferably comprises an aqueous slurry of calcium oxide which is chemically inert and nonreactive both with respect to stainless steel and to titanium, aluminum and many other mandrel or workpiece metals or alloys.

The finished workpiece which results from the process disclosed herein may be seen from FIG. 8 to comprise several individual layers 42, 44 and 46 of elongate, substantially cylindrical wires, rods or filaments embedded within a matrix or unitary mass generally designated by reference numeral 48 and consisting of layers 50, 52, 54 and 56 which initially comprise separate sheets and become integrally united by the diffusion bonding process to form matrix mass 48.

Illustratively assuming that the workpiece materials will comprise boron filaments in a matrix of titanium, initial layup of the assembly following the preparatory steps mentioned above will begin by placement of the first matrix layer 50, which is precut to coincide generally with the size and shape of mandrel center portion 12, in substantially continuous surface contact with center portion 12 or with stopoff sheet 40 where used. After initial placement of matrix sheet 50, which may be secured in place by suitable means such as small pieces of masking tape at the edge or corner portions thereof, mandrel 10 with the mentioned sheets secured thereto is mounted for rotation by suitable means (not shown) about an axis 60 shown in FIG. 3. It will be understood that both the upper and the lower parallel surfaces of center section 12 are used to support tooling and workpiece elements exactly corresponding with those shown in FIG. 1, for example, and discussed hereinbelow, whereby two identical workpieces result from the winding process disclosed herein. Winding of filament layer 42 is preferably accomplished by use of a reel of continuous filament which is moved transversely relative to axis 60 at a substantially constant rate while mandrel 10 rotates at a similarly constant rate, whereby the individual strands or filaments comprising layer 42 are progressively overlaid in contact with the replaced sheets 50 on each side of center portion 12. The filament direction of the continuous strand as it leaves the supply spool and approaches the mandrel should define substantially a 90° angle with axis 60. Alternatively, the mandrel may be fixed while a carrier with multiple spools moves around the stationary mandrel.

Winding may appropriately begin at corner B as seen in FIG. 3, whereby the individual filament will be wound between two surfaces 62 and 64 formed on edge portions 14 and 16, respectively. Surfaces 62 and 64 may be planar as suggested by FIG. 1, but are preferably semi-cylindrical about center axes such as axis 67 which are substantially parallel to axis 60, hence are adapted to receive each of the successive and closely adjacent loops of filament as the same is wound entirely around edge portions 14 and 16 together with certain portion 12. As suggested by FIG. 9, semi-cylindrical surfaces 63 and 65 have a diameter essentially equal to the thickness of mandrel center portion 12. If surfaces 62 and 54, or the center axes thereof, were not substantially parallel with axis 60, lateral slippage of individual loops across one or both surfaces could result during winding operations. When the mentioned loops have entirely traversed surfaces 62 and 64, which are of substantially corresponding length, width and area, the same continuous strand will gradually pass toward the left as seen in FIG. 3 beyond transition surfaces 66 and 68 and then begin a separate series of windings between surfaces 70 and 72. Thereafter, the process is repeated until the spool or other supply source for the single continuous filament traverses the entire length of axis 60 until corner D is completely covered by filament layer 42. Alternatively, each step can be wound simultaneously with all the remaining steps with a separate spool for each step. Following completion of the first winding step described above, filament layer 42 is secured in place by suitable means such as small pieces of masking tape or else by light application of adhesive or by flame spraying the end portions thereof proximate edges 22, 24, 26 and 28. With layer 42 thus held in place, the outermost ends of the individual filament strands are cut or broken as indicated by reference numeral 74 in FIG. 1, after which edge portions 14, 16, 18 and 20 are entirely removed from mandrel center portion 12.

Following removal of edge portions 14, 16, 18 and 20 as discussed above, the stated edge portions are reversed in position and remounted on center portion 12 of mandrel 10 as shown, for example, by FIG. 4. Thus, surface 62 shown in FIG. 4, is proximate corner A rather than in the position shown by FIG. 3 where surface 62 was proximate corner B. Similarly, the remaining edge portions of mandrel 10 are reversed in FIG. 4 compared with the positions for each edge portion shown in FIG. 3. As a result of the stated reversal, it may be seen that filament layer 44 applied over second matrix sheet 52 shown in FIG. 1 may be accomplished about an axis 76 whereby progressive movement of the supply roll along a path parallel with axis 76 and beginning proximate corner A will result in a plurality of separate loops extending around mandrel 10 between surfaces 62 and 64 shown in FIG. 4. At the completion of winding about axis of rotation 76, the process is repeated, whereby another matrix layer 54 is placed over layer 44, the windings are temporarily secured in place by tape or by flame spraying, edge portions 14, 16, 18 and 20 are removed and reversed in position on center portion 12 of mandrel 10, and the assembled mandrel and workpiece components are again rotated about axis 60 to form another filament layer 46. The stated winding steps may be repeated any desired number of times to produce any desired number of filament layers in the finished panels.

The final step after all filament winding has been completed is placement of a matrix sheet over the last filament layer on either side of mandrel 10, such as layer 56 in FIG. 1, after which the tapes or other temporary holding means are removed and the workpiece and mandrel assembly, preferably without edge portions 14, 16, 18 and 20, is placed in an airtight container such as a steel retort 80. Thereafter, the retort is welded or otherwise closed completely to hold the matrix sheets and filament layers in close surface contact and to isolate the contents of the retort from surrounding atmosphere. The retort is preferably evacuated or else filled with a suitable inert gas such as argon or helium, after which the diffusion bonding of filament and matrix layers to form substantially unitary mass 48 shown in FIG. 8 is accomplished by subjecting retort 80 and its contents to sufficient heat and pressure to effect solid-state joinder of the workpiece materials according to principles known heretofore, the details of which are not germane to the invention in this case. Following completion of diffusion bonding, the workpiece assembly is removed from retort 80 and the two duplicate panels are separated from each side of mandrel center portion 12.

The prior art involving solid-state or inter-molecular diffusion bonding includes issued U.S. Pats. 3,145,466; 3,180,022; 3,044,160; 2,850,798; and 3,170,234. The precise values of time, temperature and pressure utilized in connection with bonding of workpiece materials is not a critical or limiting feature of the broad concept disclosed herein, and specific materials with which the concept is usable are stated for illustration only. The method disclosed herein has been used successfully with matrix materials of aluminum, copper, nickel, and titanium; and filament materials of boron, beryllium, tungsten, silicon carbide and stainless steel. The number of filament layers has been varied over a wide range in different workpieces, from two to forty, with a commensurately wide range of panel thicknesses and filament densities.

As noted hereinabove, FIGS. 5 and 6 show alternative embodiments of the inventive concept disclosed herein, but are not preferred because of the higher proportion of workpiece material losses for each finished composite panel compared with the embodiment shown in FIGS. 1–4. However, some advantages are obtained from the approach disclosed in FIGS. 5 and 6 compared with fabrication techniques known to the prior art, such as adaptability of the winding process for use with standard lathes. Thus, the mandrel can be turned between centers on a lathe, while wire filament is fed from a spool laterally moved by the lathe tool mount so that filament spacing is controlled by adjusting the lathe feed rate.

While the stopoff coating of calcium oxide mentioned hereinabove is effective in preventing diffusion bonding of work-piece materials with mandrel surfaces, it is basic to the inventive concept disclosed herein that oxides of rare earth elements are useful as stopoff materials instead of CaO because they are chemically more stable than the oxides of most matrix materials such as titanium and aluminum. It has been found, for example, that yttrium oxide ($Y_2O_3$) is superior to calcium oxide in some cases, notably where matrix sheet 50 is of titanium. Also, it is especially helpful in the application of the stopoff coating if such coating is in a thickened semi-liquid or paste-like state which will adhere to some extent on the surface to which it is applied. Calcium oxide will adhere when combined with water in an amount sufficient to produce a paste-like consistency without requiring addition of a binder. Although yttrium oxide will adhere to a metallic surface sufficiently for some applications, it has been found that the addition of a binder thereto facilitates handling procedures during initial layup of the workpiece assembly by rendering the stopoff coating tougher and more resistant to removal through jarring or through direct contact. The best agent for providing the stated function is 3% by weight of a potassium silicate solution commercially known as Kasil #6 made by Philadelphia Quartz Company. In addition, a stopoff compound of cerium sulfide (CeS) gives good results with or without a binder such as described above, but is less practical than those already mentioned due to the relatively high cost of cerium sulfide. Gadolinium and samarium are further examples of rare earth materials, the oxides of which are useful in stopoff compounds.

While the particular details set forth above and in the drawings are fully capable of attaining the objects and providing the advantages herein stated, the specific materials and method thus disclosed are merely illustrative and could be varied to produce the same results without departing from the scope of the inventive concept as defined in the appended claims.

We claim:
1. A method of forming a multi-layer filament reinforced panel having a plurality of separate layers of filaments, each of said layers having a cross-ply angle of filament direction relative to the next nearest layer of filaments, said method comprising:
   placing a first sheet of metallic material on a plate-like mandrel having two substantialy parallel surface areas, said sheet overlying a center portion of said mandrel, and said sheet corresponding generally in shape and size with said center portion,
   supplying a continuous single strand of said filament to said mandrel,
   rotating said mandrel together with said first sheet about a first rotation axis substantialy parallel to and midway between said surface areas,
   moving said single strand along a first linear path substantialy parallel and spaced apart from said first roation axis so that said filament is wound about said mandrel and said first sheet progressively forming a first filament layer thereon,
   placing a second sheet of metallic material on said first filament layer,
   rotating said mandrel together with said first and second metallic sheets about a second rotation axis angularly displaced from said first rotation axis,
   supplying said strand to said rotating mandrel while moving said strand along a second linear path substantially parallel to said second rotation axis to progressively form a second filament layer over said second metallic sheet,
   placing a third sheet of metallic material on said second filament layer, and
   joining said sheets of metallic material with said filament layers to form a single composite workpiece of filament reinforced material.

2. The method set forth in claim 1 above, wherein:
said joining is by diffusion bonding between said sheets and said different layers.

3. The method set forth in claim 2 above, wherein:
said mandrel center portion and said first sheet of metallic material are separated by a coating comprising a rare earth oxide to prevent permanent joinder of said mandrel center portion to said first sheet.

4. The method set forth in claim 2 above, wherein:
said mandrel center portion and said first sheet of metallic material are separated by a coating of yttrium oxide to prevent permanent joinder of said mandrel center portion to said first sheet.

5. The method set forth in claim 2 above, wherein:
said mandrel center portion and said first sheet of metallic material are separated by a coating comprising calcium oxide to prevent permanent joinder of said mandrel center portion to said first sheet.

6. A method of forming a multi-layer filament reinforced panel having a plurality of separate layers of filaments, each of said layers having a cross-ply angle of filament direction relative to the next nearest layer of filaments, said method comprising:

placing a first sheet of metallic material on a plate-like mandrel having two subsequently parallel surface areas and comprising a rectangular center portion and a plurality of removable edge portions secured to said center portion.

supplying a continuous single strand of said filament to said mandrel and said first sheet, rotating said mandrel and said first sheet about a first rotation axis substantially to and midway between said surface areas, moving said single strand along a first linear path substantially parallel and spaced apart from said first rotation axis so that said filament is wound about said mandrel progressively forming a first filament layer thereon, holding said first filament layer on said mandrel while removing said removable edge portions from said center portion and replacing said edge portions on said center portion in a different relative position than that identified with said first filament layer, placing a second sheet of metallic material on said first filament layer, rotating said mandrel and said second sheet about a second rotation axis substantially parallel to and midway between said mandrel surface areas, said second rotation axis being angularly displaced from said rotation axis, moving said single strand along a second linear path substantially parallel and spaced apart from said second rotation axis so that said filament is wound about said mandrel and said second sheet progressively forming a second filament layer thereon, placing a third sheet of metallic material on said second filament layer, and joining said sheets of metallic material with said filament layers to form a single composite workpiece of filament reinforced material.

References Cited
UNITED STATES PATENTS 3,345,735   10/1967   Nicholls _____ 29—470.9

JOHN F. CAMPBELL, Primary Examiner

V. A. DI PALMA, Assistant Examiner

U.S. Cl. X.R.

29—470.9